United States Patent [19]

Grau

[11] Patent Number: 4,587,424
[45] Date of Patent: May 6, 1986

[54] METHOD FOR INVESTIGATING THE COMPOSITION OF AN EARTH FORMATION TRAVERSED BY A BOREHOLE

[75] Inventor: James A. Grau, Danbury, Conn.

[73] Assignee: Schlumberger Technology Corporation, New York, N.Y.

[21] Appl. No.: 525,342

[22] Filed: Aug. 22, 1983

[51] Int. Cl.$^4$ .............................................. G01V 5/10
[52] U.S. Cl. ..................... 250/270; 250/262
[58] Field of Search ................ 250/270, 262, 265, 269

[56] References Cited

U.S. PATENT DOCUMENTS

| | | | |
|---|---|---|---|
| 3,246,152 | 4/1966 | Caldwell | 376/165 |
| 3,461,291 | 8/1969 | Goodman | 376/118 |
| 3,510,655 | 5/1970 | Givens | 250/262 |
| 3,521,064 | 7/1970 | Moran et al. | 250/261 |
| 3,546,512 | 12/1970 | Frentrop | 376/109 |
| 4,012,712 | 3/1977 | Nelligan | 340/857 |
| 4,055,763 | 10/1977 | Antkiw | 250/270 |
| 4,317,993 | 3/1982 | Hertzog, Jr. et al. | 250/270 |
| 4,355,310 | 10/1982 | Belaigues et al. | 340/858 |
| 4,394,574 | 7/1983 | Grau et al. | 250/262 |
| 4,464,569 | 8/1984 | Flaum | 250/270 |

Primary Examiner—Alfred E. Smith
Assistant Examiner—Constantine Hannaher
Attorney, Agent, or Firm—Brumbaugh, Graves, Donohue & Raymond

[57] ABSTRACT

In the illustrative embodiments of the invention disclosed, a more accurate elemental analysis of an earth formation surrounding a borehole is achieved by comparing a gamma ray energy spectrum measured in the borehole, following irradiation of the borehole and the surrounding earth formation with high-energy neutrons, with a composite spectrum made up of a combination of weighted standard spectra of elements postulated to have contributed significantly to the borehole spectrum, wherein the standard spectra include a tool background spectrum that accounts for the spectral contribution due to neutron interactions with the tool constituents. The tool background spectrum is derived by isolating the tool contribution to one or more of the elemental standard spectra, and by using one or a combination of such isolated tool contribution spectra as the tool background spectrum. In the case of thermal neutron capture gamma ray spectra, the tool background spectrum is also preferably stripped from certain of the raw elemental standard spectra to arrive at the final elemental standard spectra for inclusion in the composite spectrum compared with the borehole spectrum. In addition to an improved elemental analysis, information is also obtained as to the borehole fluid salinity and/or the formation fluid salinity from a determination of the capture tool background yield.

48 Claims, 5 Drawing Figures

METHOD FOR INVESTIGATING THE COMPOSITION OF AN EARTH FORMATION TRAVERSED BY A BOREHOLE

BACKGROUND OF THE INVENTION

1. Field of the Invention

The present invention relates in general to nuclear well logging, and pertains in particular to an improved method for analyzing neutron-induced gamma ray energy spectra detected in a borehole in order to provide more accurate information about the elemental composition and other parameters of an earth formation surrounding the borehole.

2. Description of the Prior Art

Knowledge of the elemental composition of an earth formation surrounding a borehole (well bore) is useful in identifying possible oil and gas producing regions and in evaluating the degree of hydrocarbon saturation of such regions. For example, an analysis of the amounts of carbon and oxygen in a formation provides useful information concerning the presence of oil in the formation. Similarly, information as to the relative abundance of calcium and silicon in the formation permits the lithology of the formation to be determined. Still other formation parameters, such as the salinity of the formation fluid, the formation porosity, etc., can be ascertained from knowledge of the abundance of other formation constituents, e.g., chlorine, hydrogen, and the like.

An important and basic method for performing an accurate constituent (elemental) analysis of a formation is disclosed in U.S. Pat. No. 3,521,064, issued on July 21, 1970, to Moran et al., which is commonly owned by the assignee of this application. In accordance with the Moran et al. technique, a detected gamma ray energy spectrum for a formation of unknown composition is compared with a composite energy spectrum made up of weighted standard gamma ray energy spectra of the constituents (elements) postulated to comprise the formation. As used herein, the terms "spectrum" and "spectra," respectively. The word "energy" may or may not appear before these terms, but in either case, no difference in meaning is intended. Each standard spectrum represents the detector response over a wide energy range to the excitation of a single constituent or element. The weight coefficients (yields) for the standard spectra that provide the best fit of the composite spectrum to the unknown spectrum, as determined, for example, by the method of least squares, are functions of the relative abundance of the constituents of the formation. By appropriate selection of the elemental standard spectra, the relative abundance of each constituent of interest, such as carbon, oxygen, calcium, silicon, etc., may be obtained, from which the desired information regarding oil content, lithology, porosity, etc., may be derived.

Typically, the elemental standard spectra, or elemental standards, are determined only for those elements commonly found outside the tool, either in the borehole or in the formation, whose neutron-induced gamma ray production cross sections are large enough to produce at least a few percent of the total detected signal, i.e., H, Si, Ca, Cl, Fe, and S for thermal neutron reactions (capture reactions) and C, O, Si, Ca, Cl, Fe, and S for high energy neutron reactions (primarily inelastic scattering reactions, but also neutron-proton and neutron-alpha reactions). Elemental standards are usually determined from a set of laboratory measurements made by the tool in test formations, each containing a high concentration of one of the above elements. These measurements are made under known conditions of temperature, pressure, and detector resolution. Each measurement is carefully stripped of the secondary elemental responses using conventional stripping techniques to leave only the response due to the predominant element.

It has been found in accordance with the present invention, however, that the elemental standard spectra determined in this way include an ever-present tool contribution, or "tool background," spectrum that results from neutron interactions with the components of the tool, and most significantly with the detector itself. Moreover, when gamma rays are measured at a location in a borehole in order to obtain a gamma ray energy spectrum for a formation of unknown composition, the measured gamma ray energy spectrum also includes a tool contribution spectrum.

If the tool contribution were always a constant fraction of the total response, the errors caused by the presence of the tool contribution spectrum in the standards and the unknown spectrum could easily be corrected. As has further been determined, however, the tool contribution is not constant, but rather is highly environmentally dependent. The tool contribution for high energy neutron reactions, for instance, has been found to increase significantly at low formation porosities and when casing is present. Casing has the same effect as a low-porosity formation, that is, its presence results in fewer slowing down events and, therefore, a greater high energy neutron population in the borehole. The tool contribution for thermal neutron reactions, on the other hand, has been found to be especially dependent upon borehole salinity and formation salinity. Furthermore, as implied previously, the tool contribution varies with the energy of the neutrons producing the reactions detected. Consequently, if the tool contribution is ignored, the analysis of the measured spectra may not be sufficiently accurate to provide reliable information concerning the constituent composition of the formation investigated.

Accordingly, a need exists for a method for investigating the composition (namely, the identity and the relative abundance of the constituent elements) of an earth formation traversed by a borehole that is free from errors caused by contributions of the logging tool to either the elemental standard spectra or the measured formation gamma ray spectra.

SUMMARY OF THE INVENTION

The foregoing and other requirements of the prior art are met, in accordance with the present invention, by generating the elemental, or constituent, standard spectra in a manner which permits isolation of the spectral contribution due to neutron interactions with the logging tool, and including a tool background spectrum, representative of the tool spectral contribution, among the standard spectra that are combined in the composite spectrum to match the detected gamma ray spectrum in the fitting process. Specifically, the tool contribution spectrum is isolated by generating two standard spectra for each of one or more of the elements postulated to have contributed to the detected gamma ray (borehole) spectrum, with one spectrum of the two having a greater amount of tool contribution therein than the other. In the case of thermal neutron capture gamma ray spectra, this is preferably done by measuring one standard spectrum with a thermal neutron absorber surrounding the tool in the region of the detector (small tool contribution) and the other standard spectrum without the absorber in place (large tool contribution). Where inelastic scattering and other high-energy neutron interaction gamma rays are being detected, the same result can be achieved by measuring one standard spectrum in a high porosity test formation (low tool contribution) and the other in a low porosity test formation (high tool contribution). By stripping the low-tool contribution standard from the corresponding high-tool contribution spectrum, a residual spectrum is obtained that represents the tool contribution to the elemental standard spectrum in question.

As it has been ascertained, in accordance with the invention, that the shape of the tool contribution spectrum is basically the same for all elemental spectra, if desired the tool contribution spectrum need be isolated, or determined, for only one element. If so, this spectrum is included among the elemental standards as the tool background spectrum. Preferably, however, two standard spectra, each having a different amount of tool contribution therein, are generated for a plurality of elements, the low-tool contribution standard stripped from the high-tool contribution spectrum for each element, and the resulting residual (tool contribution) spectra combined together to provide the tool background spectrum. For thermal neutron capture gamma ray spectra, for example, the tool background spectrum is preferably derived by isolating and combining the tool contribution spectra for Si, Ca, H and S, while for high-energy neutron interaction gamma ray spectra, the tool background spectra may suitably be derived by isolating and combining the tool contribution spectra for Si and either Ca or CaC.

In accordance with a further aspect of the invention, the tool background spectrum, once determined, is stripped from certain of the elemental standard spectra to provide more fully corrected, i.e., purer, elemental standards for use in the fitting process. This has been found to be particularly useful in the case of thermal neutron capture spectra. Accordingly, the standard capture spectra for such formation elements as Si, Ca, H and S are preferably derived by stripping the tool background spectrum from the raw elemental standards. It has been found as a practical matter, however, that stripping of the tool background spectrum from the high-energy neutron interaction elemental standards is not as important, since the presence of the tool background contribution in the elemental standards appears to have little effect on the carbon-oxygen ratio. Thus where the principal purpose of an analysis of the high-energy neutron interaction borehole spectrum is to derive the carbon-oxygen ratio, the additional step of stripping the tool background spectrum from the elemental standard spectra may be omitted.

As will be understood, the standard spectra are measured with the same tool configuration as will be used to measure the borehole spectrum. Hence where the tool is to be run in the borehole with a thermal neutron absorber, e.g., a boron-loaded sleeve, surrounding the detector (to minimize the borehole and tool contributions to the detected spectrum), the elemental standards will likewise be measured with the absorber in place, and vice versa.

In a preferred manner of preparation of the thermal neutron capture elemental standards, sleeved (absorber) and unsleeved (no absorber) standards are measured for the elements of interest, e.g. Si, Ca, H and S. The sleeved standards are then stripped from the respective unsleeved standards to isolate the tool contribution to each elemental spectrum, and the individual tool contribution spectra are combined to form the tool background spectrum. As noted, this tool background spectrum is included among the standards used to generate the composite spectrum that is fitted to the borehole spectrum.

An amount of the tool background spectrum is preferably subtracted from the sleeved H elemental standard to remove the high-energy tail above 2.22 MeV, to provide a more fully corrected H standard. Similarly, an amount of tool background spectrum is preferably stripped from the sleeved Ca standard to force the tool background yield, $\omega_{CBT}$, in a worst-case situation to be non-negative. This same amount of tool background is then also stripped from the sleeved Si and S standards. The four corrected standards thus obtained become the final elemental standards for H, Ca, Si and S used in the fitting process when the tool is run in the borehole with the neutron absorber in place. Other elemental standards, such as for Fe and Cl, may of course also be included. For the reasons given hereinafter, stripping of the tool background from the Cl and Fe standards may be omitted, and it may even be desirable in some circumstances to add tool background back to the Fe standard.

When the tool is run without the neutron absorber, however, the final elemental standards are preferably derived by stripping an amount of tool background spectrum from the unsleeved elemental standards, for example, for H, Si, Ca and S, until the residual elemental spectra closely match the corresponding final sleeved elemental standards.

According to still another aspect of the invention, information concerning the relative contribution of the borehole to the total detected signal may be determined from the capture tool background yield.

BRIEF DESCRIPTION OF THE DRAWINGS

The objects and advantages of the present invention may be better understood by reference to the following detailed description of exemplary embodiments thereof, taken in conjunction with the accompanying drawings in which.

DETAILED DESCRIPTION OF THE PREFERRED EMBODIMENTS

Figure 1:
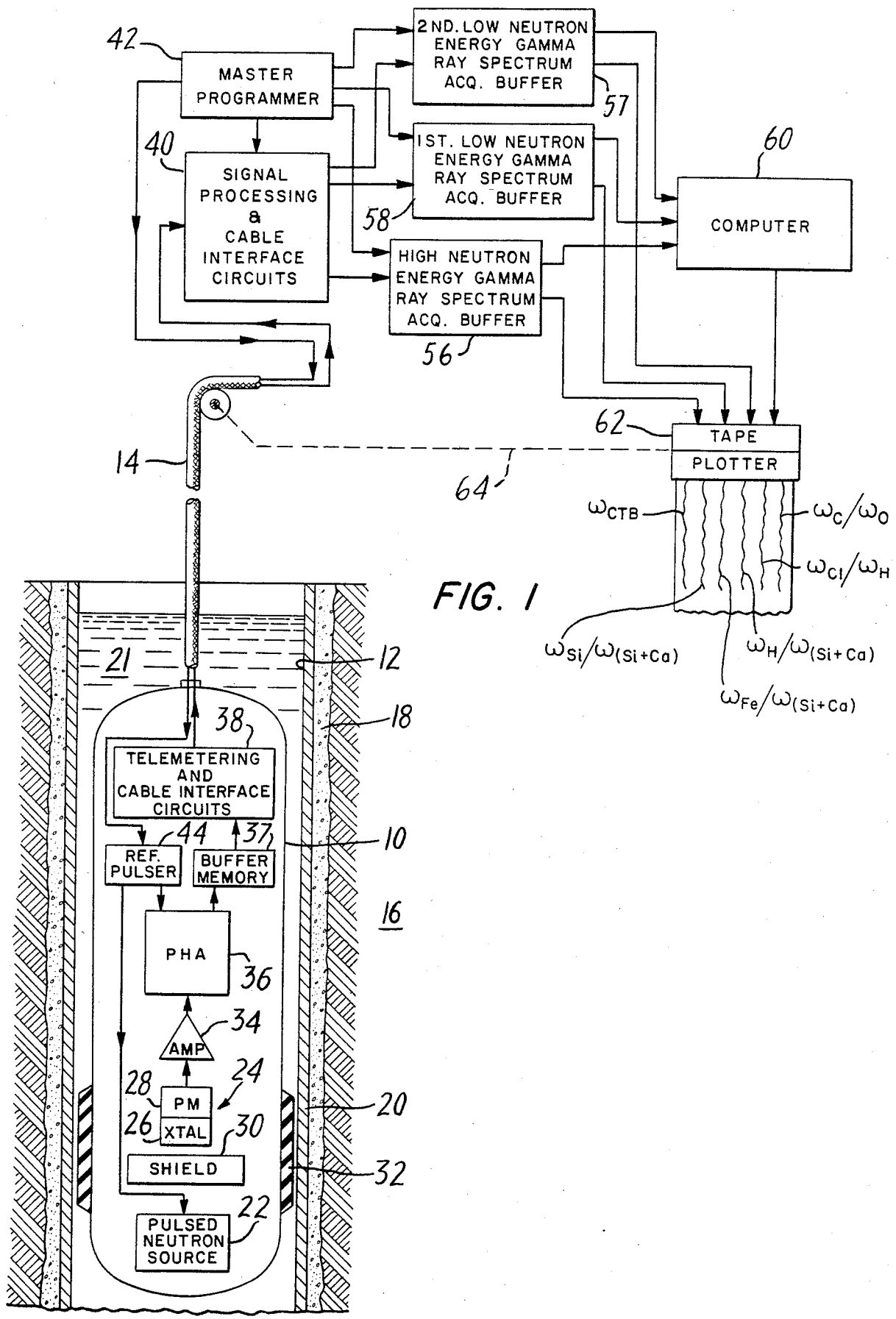
FIG. 1 is a schematic diagram of an apparatus that may be used to practice the invention.

Referring now to the drawings, and in particular to FIG. 1, a tool or sonde 10 that may be used to practice the invention is illustrated. The sonde is fluid tight, pressure- and temperature-resistant, and is adapted to be suspended in a borehole or well bore 12 by an armored cable 14. The sonde 10 is used for investigating a subsurface earth formation 16. The well bore 12 is illustrated as cased, including the usual annulus of cement 18 and steel casing 20, and as containing a well fluid 21. Although no tubing is shown in the well bore, the tool may be sized for through-tubing use if desired. It will be understood that the invention has application also to open hole logging.

The sonde 10 includes a pulsed neutron source 22 and a radiation detector 24. Preferably, the neutron source 22 is an accelerator neutron source, such as described in U.S. Pat. Nos. 3,461,291 to C. Goodman and 3,546,512 to A. H. Frentrop, both of which are commonly owned with this application. This type of neutron source is particularly adapted to generate discrete bursts of high energy or fast neutrons, e.g., 14-MeV neutrons, with a controlled duration and repetition rate.

The detector 24 may be of any construction appropriate to the detection of gamma rays and to the production of a pulse signal in response to each detected gamma ray having an amplitude representative of the energy of the detected gamma ray. Generally, such a detector includes a scintillation crystal 26, which is optically coupled to a photomultiplier tube 28. The crystal is preferably of the thallium-activated sodium iodide type, although any suitable crystal, such as thallium or sodium-activated cesium iodide, may be used. Alternatively, a semiconductor detector, having, for example, a germanium crystal, might be employed. A neutron shield 30 may be positioned between the source 22 and the detector 24 to reduce bombardment of the detector by neutrons emanating directly from the source.

Electrical power for the sonde 10 is supplied through the cable 14 from a source of power (not shown) at the surface. Suitable power sources (not shown) are also included in the sonde 10 for the purpose of driving the neutron source 22, the detector 24, and the other downhole electronics. The sonde 10 may be surrounded by a sleeve 32 loaded with a thermal neutron absorbing material, preferably boron carbide, that is located generally in the region of the source 22 and detector 24. The sleeve 32 acts as a shield to minimize the detection of gamma radiation originating from neutron interactions in the immediate vicinity of the source and detector. In those cases where the well bore, casing or tubing is too small for a sleeve 32, the sonde may be used without a sleeve.

An amplifier 34 acts on the output pulses from the photomultiplier 28. The amplified photomultiplier pulses are thereafter applied to a pulse height analyser (PHA) 36, which may be of any conventional type, such as a single ramp (Wilkinson rundown) type. It will be understood that the pulse height analyzer includes the usual low-level and high-level pulse height discriminators, for selection of the gamma ray energy range to be analyzed, and linear gating circuits, for control of the time portion of the detector signal train to be analyzed. Suitable discriminator settings, e.g., from 1.6 Mev to 7.5 Mev, are described in the Moran U.S. Pat. No. 3,521,064 and in U.S. Pat. No. 4,055,763, issued on Oct. 25, 1977 to Stephen Antkiw for "Neutron Characteristic and Spectroscopy Logging Methods and Apparatus", and appropriate gating sequences for the linear gating circuits, to selectively detect high-energy neutron gamma rays and low-energy neutron gamma rays, are described in the Antkiw patent and in U.S. Pat. No. 4,317,993 issued on Mar. 2, 1982 to Russel C. Hertzog, Jr. et al. for "Methods and Apparatus for Constituent Analysis of Earth Formations". The pertinent portions of those patents are hereby incorporated by reference.

The PHA 36 segregates the detector pulses into predetermined channels according to their amplitudes and supplies signals in suitable digital form representing the amplitude of each analyzed pulse. The digital outputs of PHA 36 are stored in the memory buffer 37 and then transferred to telemetering and cable interface circuits 38 for transmission over cable 14 to the surface. At the surface, the cable signals are received by signal processing and cable interface circuits 40. It will be understood that the circuits 38 and 40 may be of any suitable known construction for encoding and decoding, multiplexing and demultiplexing, amplifying and otherwise processing the signals for transmission to and reception by the uphole electronics. Appropriate circuits 37, 38 and 40 are described, for example, in U.S. Pat. No. 4,012,712, issued on Mar. 15, 1977, to William B. Nelligan for "System for Telemetering Well Logging ata." Alternatively, the circuits described in U.S. Pat. No. 4,355,310 issued on Oct. 19, 1982 to Antoine Belaigues et al. for "Well Logging Communication System", may be employed.

The operation of the sonde 10 is controlled by signals sent downhole from a master programmer 42 located at the surface. These signals are received by a reference pulser 44, which, in response thereto, transmits control signals to the neutron source 22 and to the PHA 36. The manner in which this control is carried out is described more fully in the referenced portions of the Antkiw patent and the Hertzog patent.

The gamma ray spectra due to high energy neutron (inelastic scattering, neutron-proton, and neutron-alpha) reactions and low energy, including thermal neutron (capture), reactions are generated by data acquisition buffers 56, 57, and 58, which, under the control of the master programmer 42, accumulate the appropriate gamma ray counts-per-channel signals from the signal processing and cable interface circuits 40. As used herein, the terms "high energy" and "low energy" refer to "high neutron energy" and "low neutron energy," respectively, although the word "neutron" may not be included. Additionally, the spectra referred to hereinafter are gamma ray spectra, but the term "gamma ray" may not be used. Specifically, the high neutron energy gamma ray spectrum acquisition buffer 56 accumulates the high neutron energy gamma ray counts-per-channel data, which is obtained using a gating period during the neutron pulse produced by the neutron source 22, for a specified period long enough to give a statistically satisfactory spectrum and is then instructed by the master programmer 42 to output the spectrum, recycle to zero, and accumulate a new gamma ray spectrum for a like period. Similarly, the first low neutron energy gamma ray spectrum acquisition buffer 58 accumulates the gamma ray counts-per-channel data, which is obtained using a gating period following—possibly immediately following—the neutron pulse, for a specified period, outputs the spectrum, recycles to zero, and accumulates a new spectrum for a like period. The second low neutron energy gamma ray spectrum acquisition buffer 57 operates in much the same manner, but the gating period for the gamma counts-per-channel data starts after the gating period associated with the first low energy spectrum acquisition buffer 58 ends, and the gating period ends before the next neutron pulse. As will be understood, the measured gamma ray spectra, both high neutron energy and low neutron energy, that are processed and analyzed are pulse height spectra; however, the term "pulse height" may not be used, but in either case, no change in meaning is intended. It will also be understood that, for purposes of permitting the separate accumulation of the high neutron energy gamma ray spectrum and the low neutron energy gamma ray spectra, the signals from PHA 36 to the buffer memory 37 may include digital address information, e.g., flag bits, that may designate particular gating periods.

Following accumulation in the acquisition buffers 56, 57, and 58, the spectra are transferred to storage buffers (not shown) in a constituent analysis computer 60. The computer 60 may comprise a general purpose digital computer, such as the PDP-11 computer manufactured by the Digital Equipment Corporation, Maynard, Mass., or alternatively, it may comprise an analog computer. In either event, it will be understood that the computer 60 is suitably programmed or constructed to perform the spectrum matching and relative abundance determining functions described in Moran et al. U.S. Pat. No. 3,521,064, the pertinent portions of which are hereby incorporated by reference. In the case of the high energy spectrum, computer 60 is also preferably programmed to substract, prior to the spectrum matching process, the first low energy spectrum, in buffer 58, from the high energy spectrum, in buffer 56, to eliminate the low energy component from the high energy spectrum. Alternatively, the second low energy spectrum, in buffer 57, may be used to eliminate the low energy component of the high energy spectrum. However, the first low energy spectrum has been found to be more representative of the low energy component of the high energy spectrum, and the second low energy spectrum is preferably used to provide information concerning the formation. The computer 60 may be located at the well site, as illustrated in FIG. 1, or it may be located remotely and operate on recorded representations of the data, such as would be made by recording the data from the spectrum acquisition buffers 56, 57, and 58 on magnetic tape, as is illustrated in FIG. 1.

Within the computer 60, the signals representing the measured spectrum to be analyzed, high energy or capture, are applied to spectrum comparison circuits (not shown) for comparing the measured spectrum to a set of elemental standard spectra, high energy or capture, whichever set is appropriate. As described in the Moran et al. patent, the measured unknown spectrum is compared with a linear combination of the weighted elemental standard spectra to determine the proportions of the constituents that provide the combination, i.e., the composite spectrum, which most nearly matches the unknown measured spectrum. Preferably the least squares criterion is used to determine when a best fit has been obtained between the composite spectrum and the unknown spectrum. The weights ($\omega_i$) for the respective elemental standards which produce the best fit represent the proportions of the corresponding gamma ray yields from the elements (i) in the formation.

The elemental weights ($\omega_i$) may be recorded directly or, alternatively, selected weights ($\omega_i$) may be combined by the computer 60 to derive indicators of formation properties of interest. Exemplary indicators are described in Antkiw U.S. Pat. No. 4,055,763, the pertinent portions of which are hereby incorporated herein. Preferably, the indicators developed by the computer 60 include, from the high-energy spectral analysis, the carbon-oxygen ratio, $\omega_C/\omega_O$, and, from the capture spectral analysis, a salinity-indicator ratio, $\omega_{Cl}/\omega_H$, a porosity-indicator ratio, $\omega_H/\omega_{(Si+Ca)}$, a shale-indicator ratio, $\omega_{Fe}/\omega_{(Si+Ca)}$, and a lithology-indicator ratio, $\omega_{Si}/\omega_{(Si+Ca)}$. The computer 60 is further programmed or constructed to supply a signal indicative of the "capture tool background" yield, $\omega_{CTB}$, the utility of which is described hereinafter.

As shown in FIG. 1, the computer 60 supplies the foregoing indicator signals to a recorder 62, which includes conventional visual and magnetic tape components for making a customary record of logging signals as a function of depth. The usual cable-following mechanical linkage 64 for driving the recorder 62 in synchronism with the cable 14 is provided for this purpose.

As previously mentioned, if the tool 10 of FIG. 1 is used to measure gamma ray spectra, which are later analyzed in the manner described, inaccuracies in the elemental analysis will occur unless the tool contribution to the elemental standards and the measured spectra is accounted for. The tool contribution, or background, may be accounted for by, firstly, eliminating the tool contribution spectrum from each elemental standard spectrum and, secondly, by including the tool contribution spectrum along with the elemental standard spectra when performing the spectral analysis; that is to say, by using the tool contribution spectrum as an additional standard in the fitting set. To do this, the tool contribution spectrum must be derived. Since the tool contribution varies not only environmentally but also with the energy of the neutrons producing the reactions detected, tool contribution spectra must, therefore, be derived separately for thermal neutron reactions and for high energy neutron reactions. The techniques for deriving the thermal neutron capture tool contribution spectrum and the high energy tool contribution spectrum will be discussed, in this order, below.

In order to derive the capture tool contribution spectrum, elemental standard spectra are generated in the normal manner for the most prominent elemental contributions to the capture spectrum. For example, measurements of thermal neutron reactions over the gamma ray energy range of interest, e.g. 1.6 MeV to 7.5 MeV, are made in test formations of oil and iron, oil, sandstone, limestone, sulphur, and brine to obtain spectra having as the predominant contributors Fe, H, Si, Ca, S and Cl, respectively. Each measurement is then stripped of secondary responses to obtain a raw elemental standard spectrum for the associated element. However, two such measurements, each having a different amount of tool contribution, must be made in at least one, and preferably all, of these test formations to permit isolation of the capture tool contribution spectrum.

It has been determined, in accordance with the invention, that satisfactory isolation of the tool contribution may be achieved by making one measurement with a neutron absorbing material, such as the boron-loaded sleeve 32, around the tool and by making another measurement without the neutron absorbing material. Boron is preferred because of its high thermal neutron absorption cross section and absence of a gamma ray above 0.5 MeV, but other absorbers may be used, if desired. When a thermal neutron absorbing material is not used, thermal neutrons will interact with the tool used to take the measurement and will cause a portion of the total signal to be due to interactions with the tool. When a thermal neutron absorbing material is used, however, the number of thermal neutrons in the vicinity of the detector that interact with the tool is substantially reduced, and the tool contribution to the total signal is reduced accordingly. There is nonetheless a residual tool contribution to the total signal. Consequently, merely using a thermal neutron absorber around the tool will not completely eliminate the tool contribution.

Figure 2:
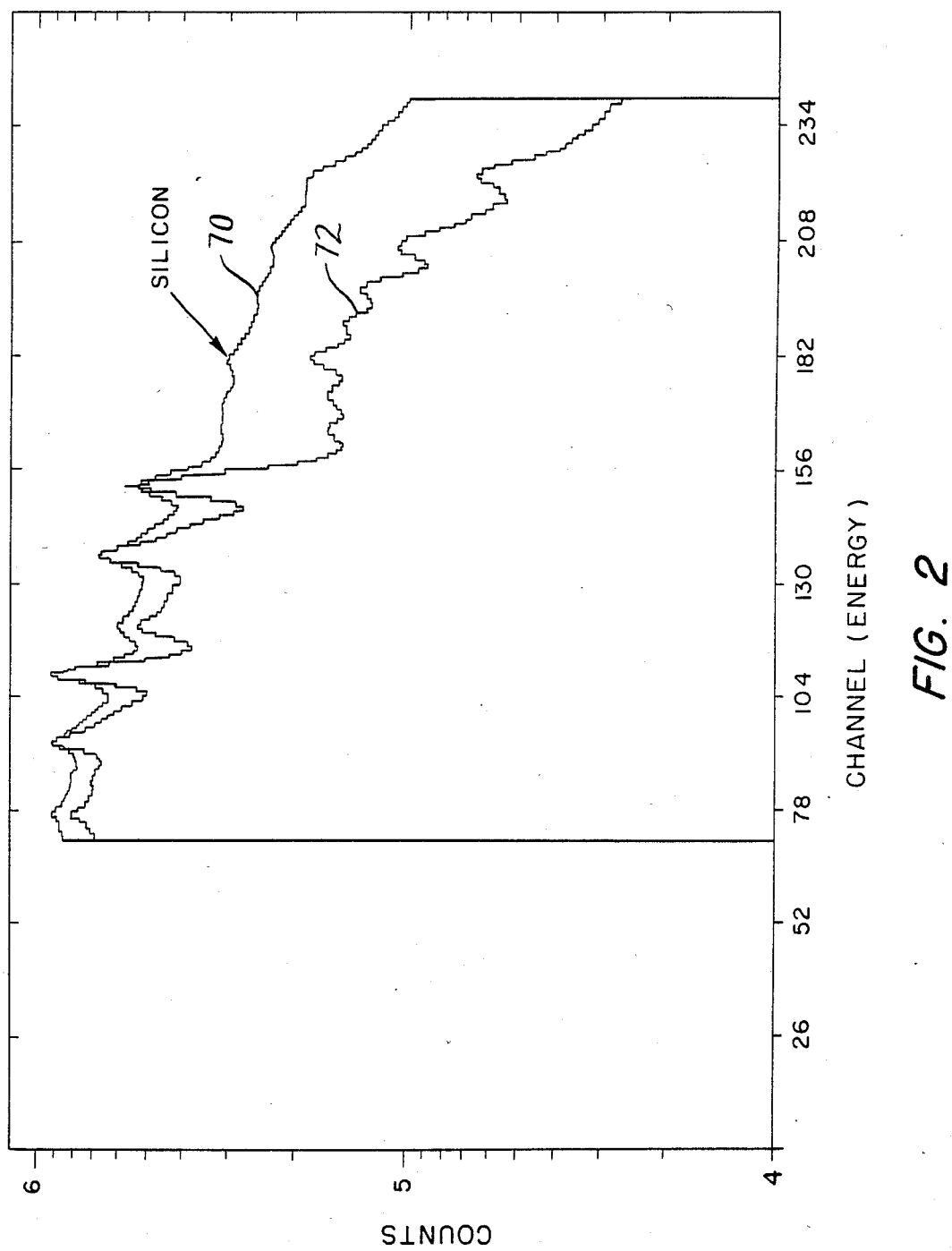
FIG. 2 is a graph showing pulse height spectra for capture reactions with silicon that were determined both with and without a thermal neutron absorbing material around the tool.

FIG. 2 shows two gamma ray energy standard spectra 70 and 72 for silicon. The upper curve 70 was generated without the boron-loaded sleeve 32 around the tool, and the bottom curve 72 was generated with the sleeve 32 in place. As will be appreciated, the difference between the two elemental spectra represents the tool contribution. The tool contribution spectrum may be derived by stripping sleeved spectrum 72 from the unsleeved spectrum 70, using the criterion of eliminating one or both of the Si 3.54-MeV and 4.93-MeV peaks. Similarly, in the case of sleeved and unsleeved elemental spectra for hydrogen, the tool contribution spectrum may be derived by stripping the sleeved hydrogen standard from the unsleeved hydrogen standard to eliminate the 2.22 MeV hydrogen peak. The tool contribution may likewise be derived for each of the other elemental capture standards.

In practice, however, it is usually unnecessary to ascertain the tool contribution to the chlorine and iron standards. In the case of chlorine, the thermal neutron capture cross section of chlorine is so large that the tool contribution signal is insignificant relative to the chlorine signal, and may be ignored. The iron standard, on the other hand, may be derived in a manner that is effectively self-compensating for tool contribution. To that end, the iron standard is preferably derived by subtracting a spectrum measured in oil with a casing surrounding the tool from a spectrum measured in pure oil (no casing). The effect of the casing is to greatly reduce the number of thermal neutrons interacting with the tool and thus to correspondingly reduce the tool contribution to the measured spectrum. Hence, the subtraction of the oil-only spectrum from the oil-plus-casing spectrum automatically accounts for the tool contribution to the iron standard. Indeed, as described hereinafter, it may even be desirable in certain circumstances to add back an amount of tool background spectrum to the iron standard.

Figure 3:
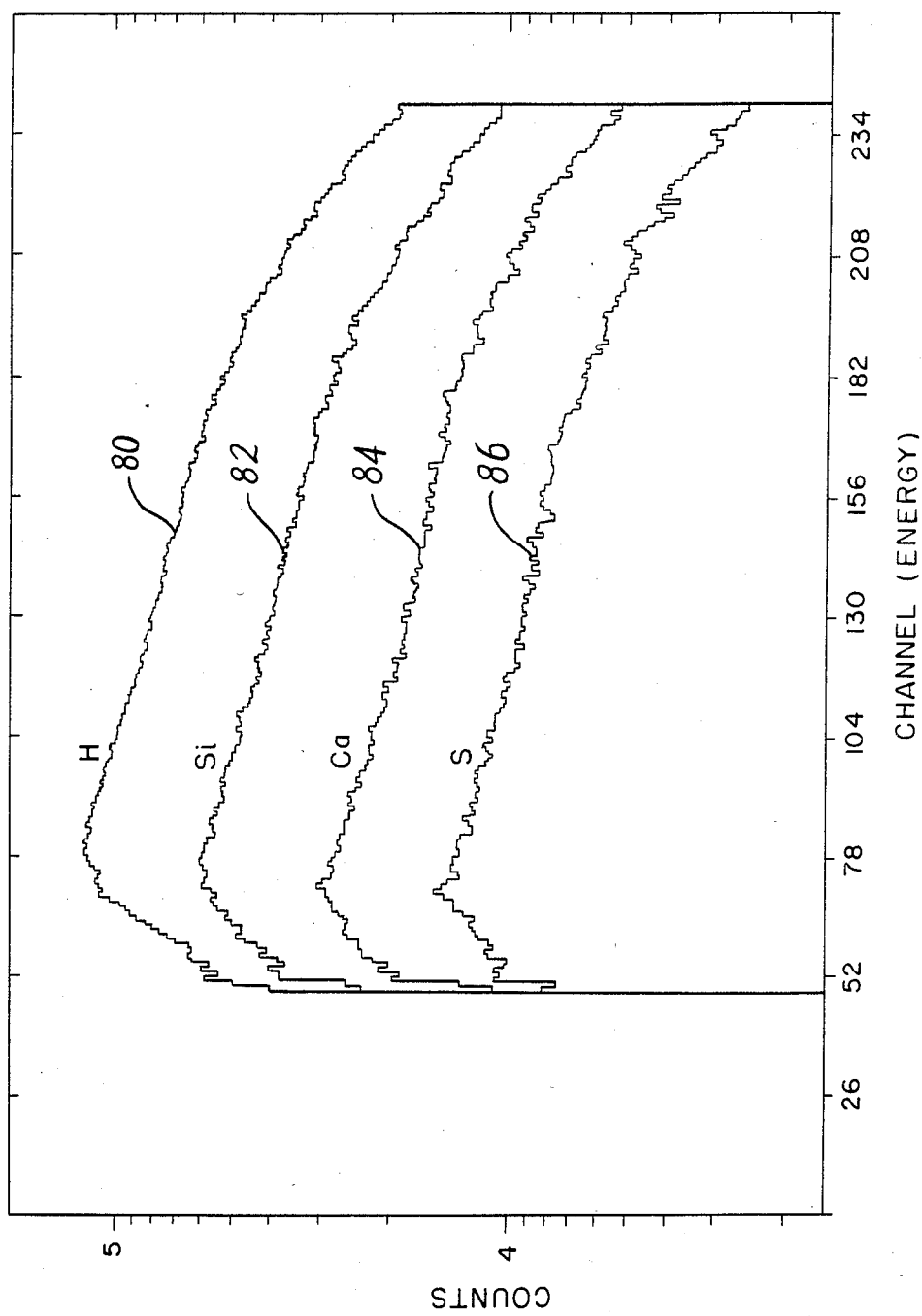
FIG. 3 is a graph showing the tool contribution pulse height spectra to the standard capture spectra for various elemental formation constituents, illustrating by the nearly identical spectral shapes that the tool contribution spectrum is substantially the same in all elemental spectra.

FIG. 3 shows four tool contribution spectra 80, 82, 84, and 86 that were derived by combining (stripping) sleeved and unsleeved standard spectra by hydrogen, silicon, calcium, and sulphur, respectively. As is apparent, the shape of each tool contribution spectrum 80, 82, 84, and 86 is approximately the same. This similarity confirms that the differences in the elemental standard spectra determined with and without a thermal neutron absorber around the tool are produced by a common contribution from the tool.

While the tool contribution spectrum, hereinafter referred to as the "tool background spectrum," may be derived by combining two elemental standard spectra, each having a different amount of tool contribution, for just one element, e.g., hydrogen or silicon, a better background spectrum is obtained by combining the residual tool contribution spectra for several elements to form a weighted average tool contribution spectrum. Thus, the tool contribution spectra 80, 82, 84, and 86, for hydrogen, silicon, calcium, and sulphur, respectively, may be added, and then the counts in each channel may be divided by four to obtain a weighted average tool contribution spectrum—the weighting factor for each spectrum in this case being 1.0. Alternatively, another appropriate weighting factor for each spectrum may be used when the tool contribution spectra are combined. The magnitude of the weighted average tool contribution spectrum is not important for purposes of the spectral analysis technique; only the shape of the spectrum is used in the analysis.

Once the weighted average tool contribution spectrum is derived, the tool contribution may be stripped from each of the raw Si, Ca, S and H elemental standard spectra to provide corrected elemental standard spectra. It will be understood that this is done for both the raw unsleeved elemental standards and the raw sleeved elemental standards, to provide a correct set of unsleeved elemental standards for use where the tool 10 is run without a sleeve 32 and a corrected set of sleeved elemental standards for use where the tool 10 is run with a sleeve 32. The appropriate corrected elemental standards for Si, Ca, S and H, together with the corresponding Fe and Cl standards, are then used in the spectral analysis in lieu of the uncorrected, or raw, elemental standard spectra. The corrected Fe and Cl standards may simply be taken as the raw unsleeved or sleeved, as the case may be, elemental standards for Fe and Cl. The tool background spectrum, or weighted average tool contribution spectrum, is also used in the spectral analysis as another elemental standard. Accordingly, the tool contribution is accounted for, and better, more accurate, and more reliable information about the existence of oil is obtained.

Although the foregoing affords improved results relative to the prior art, it has been found that some residual tool contribution still remains in the corrected standard spectra in certain circumstances. Such residual tool contribution in the standards can lead to erroneous yields ($\omega_i$) in the fitting analysis, and manifests itself in the form of negative tool background yields ($\omega_{CBT}$). The presence of residual tool contribution in the standard spectra may be corrected for by subtracting enough of the tool background standard from each of the elemental standard spectra to avoid negative tool contribution yields. Generally, this may be done by looking at the tool contribution yield for the worst case, i.e. a large borehole (e.g. 10 inches, high borehole salinity (e.g., 250 Kppm), and high porosity (e.g. 40 p.u.), and stripping enough tool background standard from the sleeved calcium elemental standard to force the tool contribution yield ($\omega_{CBT}$) to be non-negative. The same amount of the tool background spectrum is then also stripped from the sleeved silicon and sulphur standards. Finally, an amount of tool background spectrum is stripped from the sleeved hydrogen standard to remove the high-energy tail, i.e., that portion of the spectrum above the 2.22 MeV peak that is not due merely to pulse pile-up. The resulting sleeved elemental standards for Ca, Si, S and H then comprise the final fully corrected set of sleeved capture standards. These standards, together with the raw sleeved standards for Fe and Cl and the tool background standard, are used in the fitting analysis when the unknown spectrum is measured with the sleeve 32 in place on the tool 10.

When the unknown spectrum is measured without the sleeve 32 in place, an improved final set of unsleeved elemental standards may be derived by stripping an amount of the weighted average tool contribution spectrum from the unsleeved raw elemental standards for Ca, Si, S and H until the residual elemental spectra most closely match the respective final, fully corrected sleeved elemental standards. This final set of unsleeved elemental standards is then employed in the fitting analysis as the unsleeved elemental standards. The tool background standard is of course also included, as are the unsleeved raw standards for Fe and Cl.

In the case of the unsleeved standard for Fe, however, it is possible to still further refine the standard by adding back an amount of tool background spectrum, e.g., approximately 5% to 10% of the total counts, to compensate for the aforementioned over-subtraction of tool contribution which occurs in the process of deriving the raw unsleeved Fe standard. Preferably, enough tool background spectrum is added to the raw unsleeved Fe standard to bring it into a close match with the raw sleeved Fe standard. This corrected Fe standard may then be used in the final set of unsleeved standards.

The high energy tool contribution is accounted for in a similar, although not identical, manner as the capture tool contribution. As mentioned, it has been found that the high energy tool contribution varies with porosity and is especially significant at low porosities. Thus, an elemental standard spectrum that is determined using a test pit with a formation having a relatively low porosity, e.g., 0%, will have a significantly larger tool contribution than an elemental standard spectrum determined using a test pit with a formation having a relatively high porosity, e.g., 17%. Consequently, two measurements, each having a different amount of tool contribution, may be made by using test formations with different porosities. This is analogous to the above-described technique for determining the capture tool contribution, wherein one measurement is made with a thermal neutron absorber around the tool and another measurement is made without the thermal neutron absorber. After the two measurements are made, the high energy tool contribution spectrum may be derived by stripping the high-porosity elemental standard spectrum from the corresponding low-porosity elemental standard spectrum by employing well-known stripping techniques. As with the capture tool contribution spectrum, it is the shape of the high energy tool contribution spectrum that is important rather than the magnitude.

More specifically, high energy elemental standard spectra are typically generated for the following elements: C, O, Si, Ca, Cl, Fe, and S. If desired, the elemental standard spectra for Ca and C may be merged to form a single Ca—C elemental standard spectrum, which could be determined using a limestone test formation. As in the case of the capture tool standards, the high-energy elemental standards are derived by making spectral measurements in suitably formulated test formations to obtain spectra having the desired individual elements as the predominant contributors. For example, measurements of high energy neutron reactions may be made by a tool in test formations of water, water and iron, iron and oil, oil, sandstone, and limestone, with each measurement than being stripped of secondary responses to obtain the raw elemental standard spectra for Fe, O, C, Si and Ca—C.

To permit isolation of the high-energy spectrum, raw elemental spectra are derived for at least one, and preferably both, of Si and Ca—C in both high-porosity sandstone and low-porosity sandstone, in the case of Si, and both high-porosity limestone and low-porosity limestone, in the case of Ca—C. The high energy tool contribution spectrum may be derived by stripping the high-porosity elemental standard from the corresponding low-porosity elemental standard, e.g. by stripping a 17 p.u. Si standard from a 0 p.u. Si standard to eliminate the 1.78 MeV peak and/or by stripping a 17 p.u. Ca—C standard from a 0 p.u. Ca—C standard to eliminate the 4.43 MeV C peak.

Either residual spectrum may be used alone as the high energy tool background spectrum or, if both are derived, may be added together, in the manner previously described, to form a weighted average tool background spectrum.

Once the high energy tool background spectrum is obtained, it is used as a standard along with the elemental standards when performing the spectral analyses of the unknown high-energy gamma ray spectra. If desired, it may also be used to eliminate the tool contribution to the elemental standards, in the manner previously described in connection with the capture spectra. It has been found, however, that removing the tool contribution from the elemental standard spectra does not appear significantly to affect the accuracy or precision of the carbon/oxygen ratio. Hence, according to the best mode, the additional step of stripping the tool background contribution spectrum from the raw elemental standard spectra is omitted where the carbon/oxygen ratio is the only output of the high energy spectral analysis of interest. The raw elemental spectra preferably included as standards for this single output are the Fe, O, and C spectra and the high-porosity Si and Ca spectra and the tool background spectrum.

Figure 4:
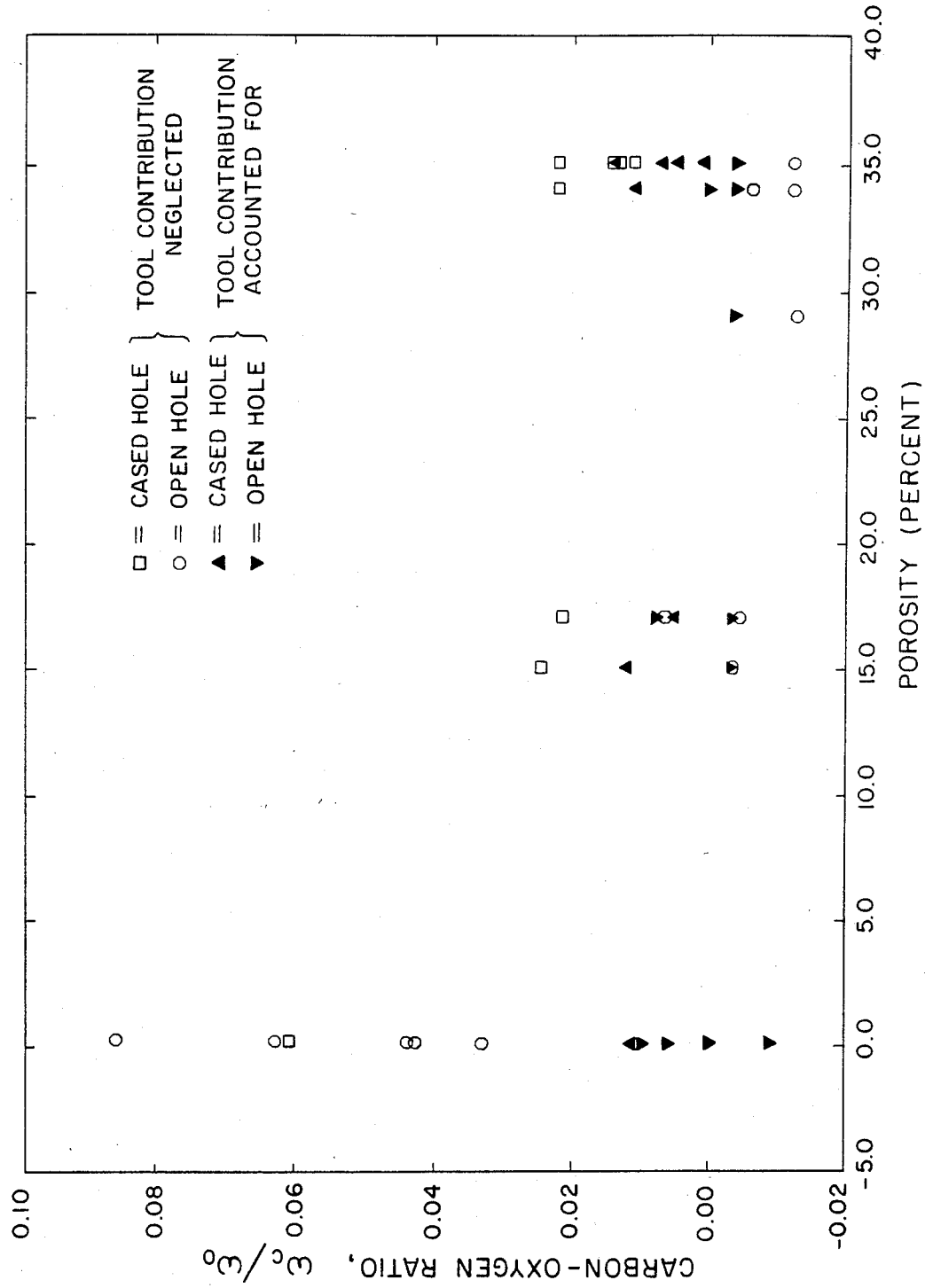
FIG. 4 is a graph of the carbon-oxygen ratio versus porosity for open and cased holes in water-saturated sandstone environments, and illustrates the effect of including a tool contribution spectrum in the elemental standard spectra set when performing analyses of measured gamma ray spectra.

FIG. 4 illustrates the effect, at different porosities, on the carbon-oxygen ratio of using a high energy tool contribution spectrum along with the high energy elemental standard spectra when performing analyses of the measured gamma ray spectra. The squares indicate data taken in a cased hole, and the circles indicate data taken in an open hole. The tool contribution was neglected when the spectral analyses were performed for these data. The triangles, normal for a cased hole and inverted for an open hole, indicate corresponding data for which the tool contribution was taken into account. As FIG. 4 shows, when the tool contribution is neglected, the carbon-oxygen ratio rises significantly at low porosities, which should not happen based on the physical characteristics of the test formations inasmuch as no carbon is present in water-saturated sandstone. A similar, though less marked, effect is seen in cased holes at higher porosities. When the tool contribution spectrum is used as an additional elemental standard, however, the carbon-oxygen ratio remains relatively constant, as it should, over a wide range of porosities. Accordingly, including the tool contribution spectrum as an elemental standard permits a more accurate spectral analysis to be performed, i.e., improves the porosity independence of the elemental yields and reduces perturbations because of casing, and provides more reliable results concerning the presence of oil. An important adjunct of a more accurate carbon-oxygen ratio, for instance, is that it permits more valid estimates of water saturation, especially at lower porosities.

In addition to improving the quality of the elemental analysis of capture spectra, the capture tool background yield ($\omega_{CTB}$) provides useful information of the relative proportion of the tool detected signal that is due to thermal neutron interactions with the contents of the borehole—the total detected signal being due to thermal neutron interactions with the formation, the borehole contents, and the tool. The borehole contribution to the total signal is important inasmuch as it aids in interpreting the results of the spectral analysis and determining whether oil is present. The borehole contribution is a function of the borehole size, the formation porosity, the total borehole capture cross section, and the total formation capture cross section. If each of these parameters were known, the borehole contribution could easily be calculated. In practice, however, usually only the borehole size is known with much certainty. The capture tool contribution yield ($\omega_{CTB}$), being a measure of the neutron flux at the detector, provides an independent measure of the relative borehole contribution.

In ascertaining the borehole contribution, the capture tool contribution yield is advantageously used as a ratio, i.e., with the numerator being the capture tool contribution yield $\omega_{CBT}$ and the denominator being 1 minus the chlorine yield ($\omega_{Cl}$) in the formation, which is known from the spectral analysis. Next, the salinity-indicator ratio $\omega_{Cl}/\omega_H$, is formed, the yield $\omega_H$ also being known from the spectral analysis. Once the capture tool contribution yield and the salinity-indicator ratio are calculated, the borehole contribution to the total signal may be determined with the aid of empirically obtained relationships between these parameters.

Figure 5:
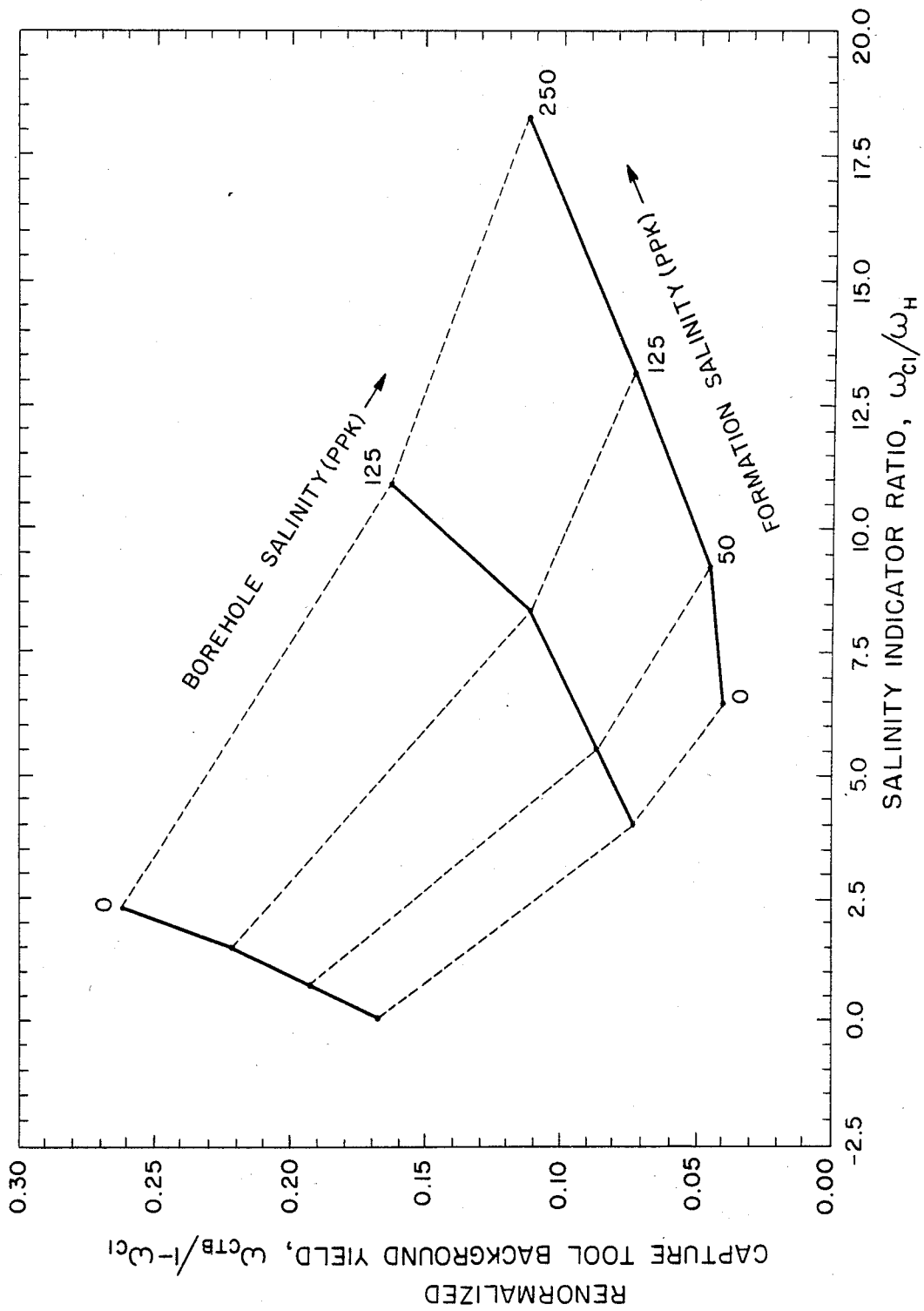
FIG. 5 is a graph of the renormalized capture tool background yield versus the salinity-indicator ratio.

FIG. 5 shows the renormalized capture tool contribution yield, $\omega_{CBT}/(1-\omega_{Cl})$, plotted as a function of the salinity-indicator ratio, $\omega_{Cl}/\omega_H$. The curves shown were obtained with a tool in a 10-inch diameter, open borehole that was surrounded by a sandstone formation having a porosity of 17 p.u. In FIG. 5, the solid lines are curves of constant borehole salinity and the dashed lines are curves of constant formation salinity. The capture tool contribution yield and the salinity-indicator ratio from analysis of a measured spectrum are used to enter the graph. These parameters determine a single point on the graph, which is associated with a specific borehole salinity and a specific formation salinity from which, in turn, the relative contribution of the borehole signal to the total signal may be determined.

Although the invention has been described herein with respect to specific embodiments thereof, it will be understood that various modifications and variations may be made to such embodiments without departing from the inventive concepts disclosed. All such modifications and variations, therefore, are intended to be included within the spirit and scope of the appended claims.

I claim:

1. A method for investigating an earth formation traversed by a borehole, comprising:
   (a) placing a logging tool, including a high-energy neutron source and an energy-responsive gamma ray detector, in the borehole opposite the formation to be investigated;
   (b) irradiating the borehole and surrounding formation with neutrons from said source;
   (c) detecting gamma rays resulting from said neutron irradiation with said gamma ray detector;
   (d) generating an energy spectrum of said detected gamma rays, said energy spectrum including (1) a contribution due to neutron interactions with the formation elements, (2) a contribution due to neutron interactions with the borehole elements, and (3) a contribution due to neutron interactions with the logging tool elements; and
   (e) comparing said detected gamma ray spectrum with a composite spectrum, made up of a combination of weighted standard spectra of elements postulated to have contributed to said detected gamma ray spectrum and including among said standard spectra a tool background spectrum representing substantially only said tool contribution, to determine the relative proportions in said detected gamma ray spectrum of the gamma ray yields for one or more of said postulated elements.

2. The method of claim 1 wherein:
   (a) standard spectra for C and O are included in said composite spectrum;
   (b) the relative proportions of the gamma ray yields for C and O are determined; and
   (c) said relative proportions for C and O are utilized to provide a carbon-oxygen ratio.

3. A method for investigating an earth formation traversed by a borehole, comprising:
   (a) generating an energy spectrum of gamma rays detected in the borehole as a result of irradiation of the borehole and surrounding earth formation with high-energy neutrons, said energy spectrum including (1) a contribution due to neutron interactions with the formation elements, (2) a contribution due to neutron interactions with the borehole elements, and (3) a contribution due to neutron interactions with the elements of the logging tool used to detect the gamma rays; and
   (b) comparing said detected gamma ray spectrum with a composite spectrum, made up of a combination of weighted standard spectra of elements postulated to have contributed to said detected gamma ray spectrum and including among said standard spectra a tool background spectrum representing substantially only said tool contribution, to determine the relative proportions in said detected gamma ray spectrum of the gamma ray yields for one or more of said postulated elements.

4. The method of claim 3 wherein:
   (a) standard spectra for C and O are included in said composite spectrum;
   (b) the relative proportions of the gamma ray yields for C and O are determined; and
   (c) said relative proportions for C and O are utilized to provide a carbon-oxygen ratio.

5. A method for investigating an earth formation traversed by a borehole, comprising:
   (a) placing a logging tool, including a high-energy neutron source and an energy-reponsive gamma ray detector, in the borehole opposite the formation to be investigated;
   (b) irradiating the borehole and surrounding formation with neutrons from said source;
   (c) detecting gamma rays resulting from said neutron irradiation with said gamma ray detector;
   (d) generating an energy spectrum of said detected gamma rays, said energy spectrum including (1) a contribution due to neutron interactions with the formation elements, (2) a contribution due to neutron interactions with the borehole elements, and (3) a contribution due to neutron interactions with the logging tool elements;

(e) comparing said detected gamma ray spectrum with a composite spectrum, made up of a combination of weighted standard spectra of elements postulated to have contributed to said detected gamma ray spectrum and including among said standard spectra a tool background spectrum representing said tool contribution, to determine the relative proportions in said detected gamma ray spectrum of the gamma ray yields for one or more of said postulated elements; and (f) deriving said tool background spectrum by:
  (1) generating first and second standard spectra, said first standard spectrum having a greater amount of tool contribution therein than said second standard spectrum, for at least one of said postulated elements;
  (2) stripping said second standard spectrum from said first standard spectrum to isolate the spectrum due to the tool contribution; and
  (3) utilizing said isolated tool contribution spectrum as at least a component of said tool background spectrum.

6. The method of claim 5 wherein:
  (a) said detected gamma ray spectrum is a high-energy neutron interaction gamma ray spectrum; and
  (b) said first standard spectrum for said at least one element is measured in a formation of relatively low porosity and said second standard spectrum for said element is measured in a formation of relatively high porosity.

7. The method of claim 6 wherein said at least one element is selected from among a group including Si, Ca and CaC.

8. The method of claim 6 wherein:
  (a) first and second standard spectra are generated for Si and one of Ca and CaC;
  (b) the high-porosity Si standard spectrum is stripped from the low porosity Si standard spectrum to isolate the tool contribution spectrum to the low porosity Si standard spectrum;
  (c) the high porosity Ca or CaC standard spectrum is stripped from the low porosity Ca or CaC standard spectrum to isolate the tool contribution spectrum to the low porosity Ca or CaC standard spectrum; and
  (d) said tool contribution spectrum to the Si standard spectrum and said tool contribution spectrum to the Ca or CaC standard spectrum are combined to provide said tool background spectrum.

9. The method of claim 5 further comprising:
  (a) generating said first and second standard spectra for each of a plurality of said postulated elements;
  (b) stripping each said second standard spectrum from the corresponding first standard spectrum to isolate the tool contribution spectrum for each of said plurality of elements; and
  (c) combining said isolated tool contribution spectra for said plurality of elements to provide said tool background spectrum.

10. The method of claim 9 wherein the standard spectrum included in said composite spectrum for each of said plurality of postulated elements is derived by stripping said tool background spectrum from a corresponding standard spectrum for each said element having a tool contribution therein.

11. The method of claim 9 further comprising stripping an amount of said tool background spectrum from said corresponding one or more standard elemental spectra sufficient to make the relative proportion in said detected gamma ray spectrum of the gamma ray yield for said tool contribution non-negative.

12. The method of claim 9 wherein:
  (a) said detected gamma ray spectrum is a thermal neutron capture gamma ray spectrum;
  (b) a standard spectrum for H is included among said standard elemental spectra included in said composite spectrum; and
  (c) said H standard spectrum is derived by stripping said tool background spectrum from said corresponding H standard spectrum to remove the high-energy tail.

13. The method of claim 9 wherein:
  (a) said detected gamma ray spectrum is a thermal neutron capture gamma ray energy spectrum; and
  (b) said plurality of postulated elements include Si, Ca, H and S.

14. The method of claim 5 wherein:
  (a) said detected gamma ray spectrum is a thermal neutron capture gamma ray spectrum; and
  (b) said first and second standard spectra for said at least one element are measured without and with, respectively, a thermal neutron absorbing material surrounding the logging tool in the region of the gamma ray detector.

15. The method of claim 14 further comprising:
  (a) generating said first and second standard spectra for each of Si, Ca, H and S;
  (b) stripping each said second standard spectrum from the corresponding first standard spectrum to isolate the tool contribution spectrum for each of Si, Ca, H and S;
  (c) combining the isolated tool contribution spectra for Si, Ca, H and S to provide said tool background spectrum.

16. The method of claim 15 wherein:
  (a) said composite spectrum includes standard spectra for each of Si, Ca, H and S; and
  (b) said standard spectra for Si, Ca, H and S are each derived by stripping said tool background spectrum from said second standard spectra for said element.

17. The method of claim 16 wherein said standard spectrum for H is further derived by stripping from said corresponding second standard H spectrum the high energy tail above 2.22 MeV, to provide a further corrected second H standard spectrum.

18. The method of claim 17 wherein said Ca standard spectrum is further derived by stripping from said corresponding second Ca standard spectrum an amount of said tool background spectrum sufficient to make the relative proportion in said detected gamma ray spectrum of the gamma ray yield for said tool contribution non-negative, to provide a further corrected second Ca standard spectrum.

19. The method of claim 18 wherein said standard spectra for Si and S are further derived by stripping from said corresponding second Si and S standard spectra substantially said amount of tool background spectrum that was stripped from said Ca standard spectrum, to provide further corrected second Si and S standard spectra.

20. The method of claim 19 wherein:

(a) said logging tool includes said thermal neutron absorbing material surrounding the tool in the region of said gamma ray detector; and (b) said standard elemental spectra included in said composite spectrum include said further corrected second H, Ca, Si and S standard spectra.

21. The method of claim 19 wherein:

(a) said logging tool is without said neutron absorbing material surrounding the tool in the region of said gamma ray detector; and (b) said standard elemental spectra for H, Ca, Si and S included in said composite spectrum are each derived by stripping from the first standard spectrum for said each element an amount of said tool background spectrum sufficient to provide a substantially close match between the residual spectrum and said further corrected second standard spectrum for said each element.

22. The method of claim 5 wherein:

(a) standard spectra for C and O are included in said composite spectrum;

(b) the relative proportions of the gamma ray yields for C and O are determined; and (c) said relative proportions for C and O are utilized to provide a carbon-oxygen ratio.

23. A method for investigating an earth formation traversed by a borehole, comprising:

(a) placing a logging tool, including a high-energy neutron source and an energy-responsive gamma ray detector, in the borehole opposite the formation to be investigated;

(b) irradiating the borehole and surrounding formation with neutrons from said source;

(c) detecting gamma rays resulting from said neutron irradiation with said gamma ray detector;

(d) generating an energy spectrum of said detected gamma rays, said energy spectrum including (1) a contribution due to neutron interactions with the formation elements, (2) a contribution due to neutron interactions with the borehole elements, and (3) a contribution due to netron interactions with the logging tool elements;

(e) comparing said detected gamma ray spectrum with a composite spectrum, made up of a combination of weighted standard spectra of elements postulated to have contributed to said detected gamma ray spectrum and including among said standard spectra a tool background spectrum representing said tool contribution, to determine the relative proportions in said detected gamma ray spectrum of the gamma ray yields for one or more of said postulated elements, wherein one or more of said standard elemental spectra included in said composite spectrum are derived by stripping said tool background spectrum from a corresponding one or more standard elemental spectra having said tool contribution therein.

24. A method for investigating an earth formation traversed by a borehole, comprising:

(a) placing a logging tool, including a high-energy neutron source and an energy-responsive gamma ray detector, in the borehole opposite the formation to be investigated;

(b) irradiating the borehole and surrounding formation with neutrons from said source;

(c) detecting gamma rays resulting from said neutron irradiation with said gamma ray detector;

(d) generating an energy spectrum of said detected gamma rays, said energy spectrum including (1) a contribution due to neutron interactions with the formation elements, (2) a contribution due to neutron interactions with the borehole elements, and (3) a contribution due to neutron interactions with the logging tool elements;

(e) comparing said detected gamma ray spectrum with a composite spectrum, made up of a combination of weighted standard spectra of elements postulated to have contributed to said detected gamma ray spectrum and including among said standard spectra a tool background spectrum representing said tool contribution, to determine the relative proportions in said detected gamma ray spectrum of (1) the gamma ray yields for one or more of said postulated elements and (2) the gamma ray yield for said tool contribution.

25. The method of claim 24 wherein:

(a) said detected gamma ray spectrum comprises a thermal neutron capture gamma ray spectrum; and (b) said relative proportion for said tool contribution gamma ray yield is utilized to derive information of the relative contribution to the total detected gamma ray signal of the gamma ray signal due to neutron interactions with the elements of the borehole.

26. The method of claim 25 further comprising the step of utilizing said relative proportion for said tool contribution gamma ray yield to derive information of the salinity of at least one of the borehole fluid salinity and the formation fluid salinity.

27. A method for investigating an earth formation traversed by a borehole, comprising:

(a) generating an energy spectrum of gamma rays detected in the borehole as a result of irradiation of the borehole and surrounding earth formation with high-energy neutrons, said energy spectrum including (1) a contribution due to neutron interactions with the formation elements, (2) a contribution due to neutron interactions with the borehole elements, and (3) a contribution due to neutron interactions with the elements of the logging tool used to detect the gamma rays; and (b) comparing said detected gamma ray spectrum with a composite spectrum, made up of a combination of weighted standard spectra of elements postulated to have contributed to said detected gamma ray spectrum and including among said standard spectra a tool background spectrum representing said tool contribution, to determine the relative proportions in said detected gamma ray spectrum of the gamma ray yields for one or more of said postulated elements, wherein said tool background spectrum is derived by:

(1) generating first and second standard spectra, said first standard spectrum having a greater amount of tool contribution therein than said second standard spectrum, for at least one of said postulated elements;

(2) stripping said second standard spectrum from said first standard spectrum to isolate the spectrum due to the tool contribution; and (3) utilizing said isolated tool contribution spectrum as at least a component of said tool background spectrum.

28. The method of claim 27 wherein:

(a) said detected gamma ray spectrum is a high-energy neutron interaction gamma ray spectrum; and
(b) said first standard spectrum for said at least one element is measured in a formation of relatively low porosity and said second standard spectrum for said element is measured in a formation of relatively high porosity.

29. The method of claim 28 wherein said at least one element is selected from among a group including Si, Ca and CaC.

30. The method of claim 28 wherein:
(a) first and second standard spectra are generated for Si and one of Ca and CaC;
(b) the high-porosity Si standard spectrum is stripped from the low porosity Si standard spectrum to isolate the tool contribution spectrum to the low porosity Si standard spectrum;
(c) the high porosity Ca or CaC standard spectrum is stripped from the low porosity Ca or CaC standard spectrum to isolate the tool contribution spectrum to the low porosity Ca or CaC standard spectrum; and
(d) said tool contribution spectrum to the Si standard spectrum and said tool contribution spectrum to the Ca or CaC standard spectrum are combined to provide said tool background spectrum.

31. The method of claim 27 further comprising:
(a) generating said first and second standard spectra for each of a plurality of said postulated elements;
(b) stripping each said second standard spectrum from the corresponding first standard spectrum to isolate the tool contribution spectrum for each of said plurality of elements; and
(c) combining said isolated tool contribution spectra for said plurality of elements to provide said tool background spectrum.

32. The method of claim 31 wherein the standard spectrum included in said composite spectrum for each of said plurality of postulated elements is derived by stripping said tool background spectrum from a corresponding standard spectrum for each said element having a tool contribution therein.

33. The method of claim 31 further comprising stripping an amount of said tool background spectrum from said corresponding one or more standard elemental spectra sufficient to make the relative proportion in said detected gamma ray spectrum of the gamma ray yield for said tool contribution non-negative.

34. The method of claim 31 wherein:
(a) said detected gamma ray spectrum is a thermal neutron capture gamma ray spectrum;
(b) a standard spectrum for H is included among said standard elemental spectra included in said composite spectrum; and
(c) said H standard spectrum is derived by stripping said tool background spectrum from said corresponding H standard spectrum to remove the high-energy tail.

35. The method of claim 31 wherein:
(a) said detected gamma ray spectrum is a thermal neutron capture gamma ray energy spectrum; and
(b) said plurality of postulated elements include Si, Ca, H and S.

36. The method of claim 27 wherein:
(a) said detected gamma ray spectrum is a thermal neutron capture gamma ray spectrum; and
(b) said first and second standard spectra for said at least one element are measured without and with, respectively, a thermal neutron absorbing material surrounding the logging tool in the region of the gamma ray detector.

37. The method of claim 36 further comprising:
(a) generating said first and second standard spectra for each of Si, Ca, H and S;
(b) stripping each said second standard spectrum from the corresponding first standard spectrum to isolate the tool contribution spectrum for each of Si, Ca, H and S;
(c) combining the isolated tool contribution spectra for Si, Ca, H and S to provide said tool background spectrum.

38. The method of claim 37 wherein:
(a) said composite spectrum includes standard spectra for each of Si, Ca, H and S; and
(b) said standard spectra for Si, Ca, H and S are each derived by stripping said tool background spectrum from said second standard spectra for said element.

39. The method of claim 38 wherein said standard spectrum for H is further derived by stripping from said corresponding second standard H spectrum the high energy tail above 2.22 MeV, to provide further corrected second H standard spectrum.

40. The method of claim 39 wherein said Ca standard spectrum is further derived by stripping from said corresponding second Ca standard spectrum an amount of said tool background spectrum sufficient to make the relative proportion in said detected gamma ray spectrum of the gamma ray yield for said tool contribution non-negative, to provide a further corrected second Ca standard spectrum.

41. The method of claim 40 wherein said standard spectra for Si and S are further derived by stripping from said corresponding second Si and S standard spectra substantially said amount of tool background spectrum that was stripped from said Ca standard spectrum, to provide further corrected second Si and S standard spectra.

42. The method of claim 41 wherein:
(a) the logging tool used to detect said gamma rays included a thermal neutron absorbing material surrounding the tool in the region of the gamma ray detector; and
(b) said standard elemental spectra included in said composite spectrum include said further corrected second H, Ca, Si and S standard spectra.

43. The method of claim 41 wherein:
(a) the logging tool used to detect said gamma rays was without a thermal neutron absorbing material surrounding the tool in the region of the gamma ray detector; and
(b) said standard elemental spectra for H, Ca, Si and S included in said composite spectrum are each derived by stripping from the first standard spectrum for said each element an amount of said tool background spectrum sufficient to provide a substantially close match between the residual spectrum and said further corrected second standard spectrum for said each element.

44. The method of claim 27 wherein:
(a) standard spectra for C and O are included in said composite spectrum;
(b) the relative proportions of the gamma ray yields for C and O are determined; and
(c) said relative proportions for C and O are utilized to provide a carbon-oxygen ratio.

45. A method for investigating an earth formation traversed by a borehole, comprising:
  (a) generating an energy spectrum of gamma rays detected in the borehole as a result of irradiation of the borehole and surrounding earth formation with high-energy neutrons, said energy spectrum including (1) a contribution due to neutron interactions with the formation elements, (2) a contribution due to neutron interactions with the borehole elements, and (3) a contribution due to neutron interactions with the elements of the logging tool used to detect the gamma rays; and
  (b) comparing said detected gamma ray spectrum with a composite spectrum, made up of a combination of weighted standard spectra of elements postulated to have contributed to said detected gamma ray spectrum and including among said standard spectra a tool background spectrum representing said tool contribution, to determine the relative proportions in said detected gamma ray spectrum of the gamma ray yields for one or more of said postulated elements, wherein one or more of said standard elemental spectra included in said composite spectrum are derived by stripping said tool background spectrum from a corresponding one or more standard elemental spectra having said tool contribution therein.

46. A method for investigating an earth formation traversed by a borehole, comprising:
  (a) generating an energy spectrum of gamma rays detected in the borehole as a result of irradiation of the borehole and surrounding earth formation with high-energy neutrons, said energy spectrum including (1) a contribution due to neutron interactions with the formation elements, (2) a contribution due to neutron interactions with the borehole elements, and (3) a contribution due to neutron interactions with the elements of the logging tool used to detect the gamma rays; and
  (b) comparing said detected gamma ray spectrum with a composite spectrum, made up of a combination of weighted standard spectra of elements postulated to have contributed to said detected gamma ray spectrum and including among said standard spectra a tool background spectrum representing said tool contribution, to determine the relative proportions in said detected gamma ray spectrum of (1) the gamma ray yields for one or more of said postulated elements and (2) the gamma ray yield for said tool contribution.

47. The method of claim 46 wherein:
  (a) said detected gamma ray spectrum comprises a thermal neutron capture gamma ray spectrum; and
  (b) said relative proportion for said tool contribution gamma ray yield is utilized to derive information of the relative contribution to the total detected gamma ray signal of the gamma ray signal due to neutron interactions with the elements of the borehole.

48. The method of claim 47 further comprising the step of utilizing said relative proportion for said tool contribution gamma ray yield to derive information of the salinity of at least one of the borehole fluid salinity and the formation fluid salinity.

* * * * *

UNITED STATES PATENT AND TRADEMARK OFFICE
CERTIFICATE OF CORRECTION

PATENT NO. : 4,587,424
DATED : May 6, 1986
INVENTOR(S) : James A. Grau

It is certified that error appears in the above-identified patent and that said Letters Patent is hereby corrected as shown below:

Col.6, line 39, after "Antkiw", insert --'763--;
Col.6, line 40, after "Hertzog" insert --'993--;
Col.7, line 57, after "al." insert --'064--;
Col.10, line 51, after "inches" insert --)--;
Col.11, line 66, change "than" to --then--;
Col.17, line 42, change "netron" to --neutron--;
Col.20, line 43, change "included" to --includes--;
Col.20, line 51, change "was" to --is--.

Signed and Sealed this

Ninth Day of December, 1986

Attest:

DONALD J. QUIGG

Attesting Officer

Commissioner of Patents and Trademarks